United States Patent [19]
Tysak

[11] Patent Number: 5,869,581
[45] Date of Patent: Feb. 9, 1999

[54] AQUEOUS POLISH COMPOSITIONS CONTAINING ACID-AMINE LATEXES

[75] Inventor: Theodore Tysak, Ambler, Pa.

[73] Assignee: Rohm and Haas Company, Philadelphia, Pa.

[21] Appl. No.: 911,975

[22] Filed: Aug. 15, 1997

Related U.S. Application Data

[60] Provisional application No. 60/024,423 Aug. 20, 1996.

[51] Int. Cl.⁶ .......................................................... C08F 8/32
[52] U.S. Cl. ........................ 525/375; 525/327.6; 525/379; 525/382
[58] Field of Search ..................................... 525/375, 379, 525/382

[56] References Cited

U.S. PATENT DOCUMENTS

| | | |
|---|---|---|
| 3,328,325 | 6/1967 | Zdanowski . |
| 3,404,114 | 10/1968 | Snyder et al. . |
| 4,414,360 | 11/1983 | Hackett et al. . |
| 4,517,330 | 5/1985 | Zdanowski et al. . |
| 4,760,110 | 7/1988 | Das . |
| 5,130,378 | 7/1992 | Blum et al. ................................ 525/382 |
| 5,223,580 | 6/1993 | Chaudhuri et al. ...................... 525/382 |
| 5,428,107 | 6/1995 | Tysak et al. . |

FOREIGN PATENT DOCUMENTS 2225495   12/1974   France .

*Primary Examiner*—Bernard Lipman

[57] ABSTRACT

Disclosed is a method for preparing an acid- and amine-functional polymer under conditions of free-radical initiated addition polymerization. The method involves copolymerizing an anhydride monomer with an ethylenically unsaturated monomer to produce an anhydride polymer, followed by addition of base thereto, followed immediately by addition of a diamine, and allowing the components to react. The preferred medium is aqueous. Also disclosed is an acid- and amine-functional polymer formed by the free-radical initiated addition polymerization process described herein.

9 Claims, No Drawings

5,869,581

AQUEOUS POLISH COMPOSITIONS CONTAINING ACID-AMINE LATEXES

This is a nonprovisional application of prior pending provisional application Ser. No. 60/024,423 filed Aug. 20, 1997.

BACKGROUND OF THE INVENTION

The present invention relates to novel acid- and amine-functional polymers, and a method for their preparation. This method is useful in aqueous systems, polar solvent systems, nonpolar solvent systems, or any combination thereof. The method of the present invention is especially useful in preparing latex compositions, as it involves incorporating an amine functionality into an anionically stabilized latex.

The phrase "anionically stabilized latex" refers to a latex that derives colloidal stability from the presence of either adsorbed or chemically bound anionic groups at or near the surface of the latex particle. Anionic stabilizers are usually preferred over cationic stabilizers for latex synthesis as they are readily available, are relatively low in cost, and provide a high degree of colloidal stability to the latex at relatively low use levels. Yet, those skilled in the art of emulsion polymerization are aware that imparting cationic properties to a latex can be very beneficial for improving the performance properties of the resultant coatings.

Incorporation of amine functionality into an anionically stabilized latex is very difficult. One known method is the use of amine-containing monomers with acid-containing monomers during polymerization. The main drawback to this is that, with typical single stage anionic polymerizations, introduction of the strongly basic, polar, amine-containing monomers results in the generation of cationic polymeric species, which flocculate and coagulate the anionically stabilized latex particles to such a degree that resulting latexes have little or no commercial value. In addition, there may be severe reactor clean-up problems due to accumulation of excessive amounts of coagulum within the reactor.

U.S. Pat. No. 3,404,114 (Snyder et al.) and U.S. Pat. No. 4,760,110 (Das) both teach 2-stage methods for preparing acid- and amine-functional latexes without coagulation, wherein an acid functional latex is formed first, then the pH of the emulsion is raised by addition of base, and finally the amine functionality is introduced by addition of an amine-functional monomer. The primary disadvantage to these methods is that they are prepared by the 2-stage polymer process which isolates the acid and amine moieties in separate polymer chains within the latex particle.

Certain types of acid-amine solution polymers are known, wherein amine monomer, e.g., dimethylaminoethylmethacrylate, is polymerized with methacrylic acid or other acrylic esters. The main limitation of these types of acid-amine polymers is that there are relatively few amine-functional monomers available.

STATEMENT OF THE INVENTION

The present invention is directed to a method for preparing an acid- and amine-functional polymer under conditions of free-radical initiated addition polymerization, comprising the steps of: (a) first, copolymerizing an anhydride monomer with an ethylenically unsaturated monomer to produce an anhydride polymer, wherein the amount of anhydride monomer is between 0.1 and 50.0 wt % based on the total monomer weight; (b) followed by addition of base thereto; (c) followed immediately by addition of between 0.001 and 2.0 moles of diamine per mole of anhydride; and (d) allowing the components to react.

The present invention is also directed to an acid- and amine-functional polymer formed by the free-radical initiated addition polymerization process of: (a) first, copolymerizing an anhydride monomer with an ethylenically unsaturated monomer to produce an anhydride polymer, wherein the amount of anhydride monomer is between 0.1 and 50.0 wt % based on the total monomer weight; (b) followed by addition of base thereto; (c) followed immediately by addition of between 0.001 and 2.0 moles of diamine per mole of anhydride; and (d) allowing the components to react.

DETAILED DESCRIPTION OF THE INVENTION

As used in this specification, the following terms have the following definitions, unless the context clearly indicates otherwise. "Latex" or "latex composition" refers to a dispersion of a water-insoluble polymer which may be prepared by conventional polymerization techniques such as, for example, by emulsion polymerization, and "resin" refers to the polymer in the latex. "Acid-amine polymer" or "acid- and amine-functional polymer" refers to a polymer containing both acid and amine functionality; whereas, "acid-amine latex" or "acid- and amine-functional latex" refers to a latex where the particles, but not necessarily the individual polymer chains making up the particle, contain both acid and amine functionality. "Diamine" refers to a compound containing at least two amine groups, and thus includes triamines and so on. "Lower" used in conjunction with alkyl or alkylene refers to $C_{1-12}$. The following abbreviations are used throughout this specification: nm=nanometers; g=gram (s); THF=tetrahydrofuran; and wt %=percent by weight. Ranges specified are to be read as inclusive, unless specifically identified otherwise.

It has now been discovered that a diamine, containing a first amine which is a primary or non-hindered secondary amine and a second amine which is a tertiary or hindered secondary amine, will react with one equivalent of polymeric anhydride in an emulsion polymer to generate both an acid group and an amido-amine group within the emulsion polymer. The amido portion of the amido-amine moiety is generated by reacting the primary or non-hindered secondary amine end of the diamine with the anhydride functionality in the emulsion polymer. The tertiary or hindered secondary amine part of the diamine, which is not reactive with the anhydride, is retained "as is," thereby producing an emulsion polymer which contains both an acid group and an amine group.

It has also been discovered that the analogous aminoalcohols which contain an alcohol group capable of reacting with an anhydride coupled to a tertiary or hindered secondary amine incapable of reacting with an anhydride will produce a polymer containing both acid and amine groups. In this case the aminoalcohol produces an ester amino group rather than an amido amine group. In general, the reaction of anhydride polymers with alcohols typically proceeds at a much slower rate than the reaction with the analogous amines, since amines are better nucleophiles than alcohols.

The diamines capable of producing these acid-amine polymers are those generally described by Formula (I), below:

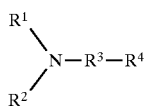

wherein:

$R^1$=H;

$R^2$=H, lower alkyl, optionally containing heteroatoms such as O, S or N, so long as the group is nonreactive with respect to anhydrides;

$R^3$ is an optional spacer group, and can be lower alkylene, optionally containing secondary, tertiary or quaternary carbons and also optionally containing heteroatoms such as O, S or N, so long as the group is non-reactive with respect to anhydrides;

$R^4$ is a sterically hindered, optionally cyclic, amine that is non-reactive with respect to anhydrides, and optionally includes non amine-reactive substituents.

As used in this specification, the term "non-reactive with respect to anhydrides" refers to a group which is non-reactive to methacrylic anhydride, as determined by the following test. One equivalent of each functional amine moiety of the diamine is reacted with 1 equivalent of methacrylic anhydride in water at 95° C. for 16 hours. At that time, the product is titrated for the methacrylic acid byproduct. If the amine moiety is non-reactive, the products at the end of the 16 hour reaction will be 2 equivalents of methacrylic acid, and 1 equivalent of the starting amine.

Preferred diamines of Formula (I) are those wherein: $R^4$=—$NR^5R^6$ or a 4- to 7-membered nitrogen-containing ring, optionally substituted with non amine-reactive groups such as heteroatoms or secondary, tertiary or quaternary lower alkyl; $R^5$, $R^6$=H, lower alkyl, optionally containing secondary, tertiary or quaternary lower alkyl, and also optionally containing heteroatoms such as O, S or N, so long as the group is non-reactive with respect to anhydrides; and provided that $R^5$ or $R^6$ can be H only if the other is t-butyl or a more hindered group.

Some examples of diamines useful in the present invention are: 3-diethylaminopropylamine, 3-dimethylaminopropylamine, N,N-diethyl-N'-methylethylenediamine, N,N-diethylethylenediamine, aminopropyldiethanolamine, 2-amino-5-diethylaminopentane, 4-(2aminoethyl)morpholine, aminopropylmorpholine, 1-amino-4-methylpiperazine, 2-(aminomethyl)-1-ethylpyrrolidine, 4-aminomorpholine, 1-amino-4-(2 hydroxyethyl)piperazine, N-aminohexamethyleneimine, triacetonediamine, N-butyl triacetonediamine, 2-(aminomethyl)pyridine, 3-(aminomethyl)pyridine, 4-(aminomethyl)pyridine, and 5-amino-2-methoxypyridine. The most preferred diamines include: 3-dimethylaminopropylamine, aminopropylmorpholine, triacetonediamine, and N-butyl triacetonediamine.

The useful level of diamine that may be employed within the context of this invention may be expressed in terms of the molar ratio of diamine to anhydride. The useful molar ratio of diamine to anhydride ranges from 0.001 to 2 moles of diamine per mole of anhydride. The preferred molar ratio of diamine to anhydride ranges from 0.01 to 1.5 moles of diamine per mole of anhydride, and the most preferred molar ratio of diamine to anhydride ranges from 0.1 to 1.0 mole of diamine per mole of anhydride.

When less than a full equivalent of diamine is employed (based on anhydride), optional monoamines, monoalcohols, di-reactive diamines, diols, polyreactive polyamines, polyols, aminosilanes, and polyaminosilanes di- may be employed as co-reactants to facilitate modification of polymer properties such as glass transition temperature and crosslinking. Suitable such compounds include but are not limited to: ammonia, methylamine, dimethylamine, ethylamine, diethylamine, propylamine, dipropylamine, isopropylamine, diisopropylamine, butylamine, dibutylamine, isobutylamine, diisobutylamine, hexylamine, cyclohexylamine, [2-(cyclohexamino)sulfonic acid], octylamine, decylamine, dodecylamine, hexadecylamine, octadecylamine, propargylamine, allylamine, diglycolamine, ethylenediamine, diethylenetriamine, triethylenetetramine, tetraethylenepentamine, 1-(2-aminoethyl)piperazine, N-(2-aminoethyl)-1,3-propanediamine, 4-(aminomethyl)piperidine, 1,2-diaminopropane,1,3-diaminopropane, 3,3'-diaminodipropylamine, 1,4-diaminobutane, 1,6-hexane diamine, 1,7-diaminoheptane, 1,8-diaminooctane, 1,9-diaminononane, 1,10-diaminodecane, 1,12-diaminododecane, 1,2-diaminocyclohexane, N,N-diethylethylenediamine, ethylene glycol, diethylene glycol, Jeffamine® C-346, Jeffamine® D-230, Jeffamine® D-400, Jeffamine® D-2000, Jeffamine® D-4000, Jeffamine® DU-700, Jeffamine® ED-600, Jeffamine® ED-900, Jeffamine® ED-2001, Jeffamine® ED-4000, Jeffamine® ED-6000, Jeffamine® EDR-148, Jeffamine® T-403, Jeffamine® T-3000, Jeffamine® T-5000, hexamethylene-bis-triacetonediamine, Polymin FG®, Polymin FG-SG®, Polymin P, Polymin PR-971®, Polymin G-35-SG®, 1,7-heptanediol, 1,2,3-heptanetriol, 1,8-octanediol, 1,9-nonane diol, 1,10-decane diol, 1,12-dodecanediol, 1,16-hexadecanediol, triethylene glycol, tetraethylene glycol, propylene glycol, dipropylene glycol, tripropylene glycol, tetrapropylene glycol, butane diol, 1,5-pentane diol, 1,6-hexane diol, polyhydroxyethylacrylate and copolymers thereof, polyhydroxyethylmethacrylate and copolymers thereof, polyhydroxypropylacrylate and copolymers thereof, poly-hydroxypropylmethacrylate and copolymers thereof, polyvinylalcohol and copolymers thereof, ethanolamine, diethanolamine, 2-(2-aminoethoxy)ethanol, 2-(2-aminoethylamino)ethanol, 2-(2-aminoethylamino) isopropanol, N-aminoethylisopropanolamine, 2-amino-2-ethyl-1,3-propanediol, 1-amino-4-(2-hydroxyethyl) piperazine, 6-amino-1-hexanol, aminomethanetrimethanol, 5-amino-1-pentanol, 2-amino-1-pentanol, 2-aminophenol, 3-aminophenol, 4-aminophenol, N-methylaminopropyltrimethoxysilane, methyl[2-(3-trimethoxysilylpropylamino)-ethylamino]-3-propionate, N-(3-acryloxy-2-hydroxypropyl)-3-aminopropyltrimethoxysilane, 4-aminobutyldimethylmethoxysilane, 4-aminobutyltriethoxysilane, (aminoethylaminomethyl) phenylethyltrimethoxysilane, N-(2-aminoethyl)-3-aminopropyltrimethoxysilane, N-(6-aminohexyl) aminopropyl-trimethoxysilane, 3-aminopropyldimethylethoxysilane, 3-aminopropylmethyldiethoxysilane, 3-aminopropyldiisopropylethoxysilane, 3-aminopropyltriethoxysilane, 3-aminopropyltrimethoxysilane, bis(2-hydroxyethyl)-3-aminopropyltriethoxysilane, 1,4-bis[3-trimethoxysilyl) propyl]ethylenediamine, bis[3-(triethoxysilyl)propyl]amine, trimethoxysilylpropyldiethylenetriamine, and the analogous polyaminosilanes derived from hydrolysis and condensation of the aforementioned alkoxyaminosilanes.

In addition, catalysts may be employed, if desired, to increase the rate of reaction of the amines and alcohols with the anhydride polymer.

The anhydride monomers useful in the present invention are those that contain unsaturation and are capable of undergoing free radical polymerization. The anhydride monomer may be an unsaturated open chain anhydride or an unsaturated cyclic anhydride. Some examples of unsaturated anhydride monomers are citraconic anhydride, maleic anhydride, tetrahydrophthalic anhydride, itaconic anhydride, acrylic anhydride, methacrylic anhydride, n-octenyl succinic anhydride, n-decenyl succinic anhydride, n-dodecenyl succinic anhydride, n-tetradecenyl succinic anhydride, n-hexadecenyl succinic anhydride, n-tricontenyl succinic anhydride, nonenyl succinic anhydride, iso-hexadecenyl succinic anhydride, and iso-octadecenyl succinic anhydride. The preferred anhydride monomers for use in this invention are acrylic or methacrylic anhydride.

The amount of anhydride monomer employed during the polymerization may range from 0.1 to 50.0 wt %, based on the total monomer weight. It is preferred to use from 0.5 to 35.0 wt % of the anhydride monomer; and most preferred to use from 1.0 to 10.0 wt %.

Typical comonomers that are useful in this invention are those that are capable of undergoing free radical polymerization with the aforementioned anhydride monomers. As used in this specification, the term "acrylic" is used in a general sense to describe polymers wherein at least one of the monomers is of the acrylic or methacrylic type, including acrylic and methacrylic acids, esters of acrylic acid or methacrylic acid, and substituted derivatives thereof. "(Meth)acryl-" includes both acrylic and methacrylic derivatives. Such monomers are well known in the art. Examples of such acrylic monomers include: alkyl (meth) acrylates such as methyl methacrylate, ethyl acrylate, methyl acrylate, N-butyl acrylate, 2-ethylhexyl acrylate, lauryl acrylate, cyclohexyl acrylate, isopropyl acrylate, isobutyl acrylate, N-amyl acrylate, N-propyl acrylate, ethyl methacrylate, N-propyl methacrylate, N-butyl methacrylate, isopropyl methacrylate, N-octyl methacrylate, dodecyl methacrylate, neopentyl acrylate, N-tetradecyl acrylate, N-tetradecyl methacrylate, isobutyl methacrylate, N-amyl methacrylate, N-hexyl methacrylate, isoamyl methacrylate, cyclopentyl methacrylate, N-decyl methacrylate, and the like; other acrylate and methacrylate esters such as 2-bromoethyl methacrylate, isobornyl methacrylate, phenyl methacrylate, 1-naphthyl methacrylate, benzyl methacrylate, 2-phenylethyl methacrylate, 3-methoxybutyl acrylate, 2-methoxybutyl methacrylate, and 2-N-butoxyethyl methacrylate; active hydrogen-functional monomers including hydroxy-substituted (meth)acrylates such as 2-hydroxyethyl acrylate and 3-hydroxypropyl acrylate; (meth)acrylate including sulfonic acids such as sulfoethyl methacrylate, and sulfopropyl acrylate; and phosphoric acids such as 2-phosphoethyl (meth)acrylate.

Additional comonomers which can be used in the present invention include: butadiene, styrene, alpha-methyl styrene, sodium styrene sulfonate, vinyl toluene, acrylonitrile, methacrylonitrile, alpha-chloroacrylonitrile, ethyl acrylonitrile, methyl vinyl ether, isopropyl vinyl ether, N-butyl vinyl ether, isobutyl vinyl ether, t-butyl vinyl ether, 2-ethylhexyl vinyl ether, 4-hydroxybutyl vinyl ether, 1,4-butaneglycol divinyl ether, diethyleneglycol divinyl ether, vinyl esters such as vinyl acetate, vinyl versatate, vinyl propionate, vinyl butyrate, vinyl isobutyrate, vinyl caproate, vinyl 2-ethylhexonate and vinyl decanoate; allyl chloride, methallyl chloride, vinylidene chloride, vinyl chloride, vinyl fluoride, vinylidene fluoride, sodium vinyl sulfonate, butyl vinyl sulfonate, phenyl vinyl sulfone, methyl vinyl sulfone, N-vinyl pyrrolidinone, N-vinyl oxazolidinone, acrolein, acrylamide, methacrylamide, N,N-dimethyl(meth) acrylamide, methylolacrylamide, N-butoxy(meth) acrylamide, isobutoxy(meth)acrylamide and the like, allyl triethoxysilane, allyl tris(trimethylsiloxy) silane, 3-acryloxypropyltrimethoxy silane, and the like; esters of other ethylenically unsaturated carboxylic acids such as dialkyl and trialkyl esters of di- and tri-carboxylic acids such as itaconic acid and the like, including di(2-ethylhexyl) maleate, dimethyl fumarate, dimethyl itaconate, diethyl citraconate, trimethyl aconitate, diethyl mesaconate, di(2-ethylhexyl) itaconate, and di-(2-chloroethyl) itaconate.

These types of monomers are typically polymerized in the presence of water-soluble or oil-soluble initiators. Examples of useful initiators include: persulfates, peroxides, hydroperoxides, percarbonates, peracetates, perbenzoates, azo-functional compounds and other free-radical generating species.

The base component can be any base capable of neutralizing methacrylic acid and reacting with the polymeric anhydride. Examples of suitable bases include: ammonia, alkali or alkaline metal hydroxides, $C_{1-3}$ alkyl- or dialkyl-amines, ethanolamine, diethanolamine, N-methylethanolamine, and hydroxylamine. It is preferred to use ammonia, sodium hydroxide, potassium hydroxide, ethanolamine, and diethanolamine.

In general, the process of the present invention involves free-radical initiated addition polymerization. Although the polymerization is preferably conducted in an aqueous medium, polar or non-polar organic solvents, or combinations thereof, may also be employed. As such polymerization techniques are well known to those skilled in the art, they will not be further discussed herein; however, the modifications employed in the method of the present invention are summarized below. First, an anhydride monomer is copolymerized with an ethylenically unsaturated monomer in the appropriate medium to produce an anhydride polymer. At that point, base is introduced into the system, followed immediately by addition of a diamine, and the components are allowed to react. In a system where water or a polar solvent is present in the medium, the anhydride polymer is subject to attack by the medium; therefore, addition of base and the diamine must be made before the anhydride polymer has significantly decomposed.

Where an aqueous medium is utilized, dispersions of these resins may be in the form of single or multi-staged particles. Multi-staged particles will comprise at least two mutually incompatible copolymers having any of a number of morphological configurations—for example: core/shell; core/shell particles with shell stages incompletely encapsulating the core; core/shell particles with a multiplicity of cores, interpenetrating network particles; and the like, where the greater portion of the surface area of the particles will be occupied by at least one outer stage, and the interior of the particle will be occupied by at least one inner stage.

Surfactants are commonly used in emulsion or dispersion polymerization to provide stability, as well as to control particle size. Conventional surfactants include anionic or nonionic emulsifiers or their combination. Typical anionic emulsifiers include but are not limited to: alkali or ammonium alkyl sulfates, alkali or ammonium alkylether sulfates, alkali or ammonium alkylarylether sulfates, alkyl sulfonates, salts of fatty acids, esters of sulfosuccinic acid salts, alkyl diphenylether disulfonates, and salts or free acids of complex organic phosphate esters. Typical nonionic emulsifiers include but are not limited to: polyethers, e.g. ethylene oxide and propylene oxide condensates which include straight and branched chain alkyl and alkylaryl polyethylene glycol and polypropylene glycol ethers and thioethers; alkyl phenoxypoly(ethyleneoxy) ethanols having alkyl groups containing from about 7 to about 18 carbon atoms and having from about 4 to about 100 ethyleneoxy units; and polyoxy-alkylene derivatives of hexitol, including sorbitans, sorbides, mannitans, and mannides. Surfactants may be employed in the polymer compositions of the present invention at levels of 0.1–3 wt % or greater, based on the total weight of the final composition.

Other optional components that can be included in this invention include co-solvents, pigments, fillers, dispersants, curing agents, wetting agents, anti-foam agents, UV absorbers, antioxidants, biocides, and stabilizers.

Curing agents or mixtures thereof may be employed to control the polymer molecular weight development before or after film formation. Typical curing agents that are reactive with anhydrides are diamines, triamines, tetraamines, etc. diols, triols, tetraols, etc. aminoalcohols, aminosilanes, where more than one of the functional groups within the curing agent molecule is reactive with anhydride or with itself and forms a covalent crosslink. These optional curing agents may be added to the final latex product after it has cooled to room temperature. When the curing agent is an amine, it may be added to the latex either as the free amine or its analogous salt. Preferred salts are acetate, formate, lactate, or bicarbonate.

In preparing the acid-amine polymers of the present invention, any chain-transfer agent, or mixtures thereof, may be used to control molecular weight. Suitable chain transfer agents include, for example, $C_{1-12}$ alkyl or functional alkyl mercaptans, alkyl or functional alkyl mercaptoalkanoates, or halogenated hydrocarbons, and may be employed in the polymer at levels of 0.1–10 wt %, based on the weight of the polymer.

The polymers of the present invention are especially useful in compositions for the tanning, retanning or other stages of leather wet-end processing, and in polish and coating compositions.

The following examples are presented to illustrate further various aspects of the present invention, but are not intended to limit the scope of the invention in any respect.

EXAMPLE 1

The following table provides the reactor charges for a latex composition of the present invention.

| REACTOR CHARGE | |
|---|---|
| INGREDIENT | AMOUNT (grams) |
| Initial Charge | |
| Deionized water | 978.6 |
| Nonylphenol 4.5 EO sulfate ammonium salt (58%) | 6.7 |
| Sodium lauryl sulfate (28%) | 13.3 |
| Sodium acetate | 7.78 |
| Feed A | |
| Ammonium persulfate | 6.5 |
| Deionized water | 36.0 |
| Feed B | |
| Acrylic polymer seed (45%; 150 nm) | 77.8 |
| Feed C | |
| Deionized water | 852.8 |
| Nonylphenol 4.5 EO sulfate ammonium salt (58%) | 26.6 |

| REACTOR CHARGE | |
|---|---|
| INGREDIENT | AMOUNT (grams) |
| Feed D | |
| Butyl acrylate | 910.0 |
| Methyl methacrylate | 735.0 |
| Methacrylic anhydride | 87.5 |
| Methacrylic acid | 17.5 |
| Rinse 1 | |
| Deionized water | 50.0 |
| Feed E | |
| Ammonium persulfate | 1.0 |
| Deionized water | 60.0 |
| Feed F | |
| Nonylphenol ethoxylate 40 EO (70%) | 50.0 |
| Polymer Reactant Feed #1 | |
| Ammonium hydroxide (28%) | 12.35 |
| Polymer Reactant Feed #2 | |
| Aminopropylmorpholine | 52.5 |
| Deionized water | 157.5 |

The initial reactor charge was heated, with stirring, to 85°–88° C. under a nitrogen blanket while Feeds A, C, D, E, and F, Polymer Reactant Feed #1, and Polymer Reactant Feed #2 were being prepared. When the reactor kettle reached 88 ° C., Feed A was fed to the reactor over 2 minutes. Immediately after completion of Feed A, Feed B was added to the reactor over 5 minutes. Immediately after completion of Feed B, Feed "CD" and Feed E were simultaneously begun. (Feed "CD" is the emulsion produced by mixing Feed D into Feed C.) Feed C/D was added, with constant stirring, over 150 minutes, while maintaining the reaction temperature at 85° C. throughout the addition of Feed C/D; and Feed E was added over 180 minutes. After completion of Feed E, the contents of the reactor were cooled to 60° C. At that point, Polymer Reactant Feed #1 was added to the reactor over 5 minutes. Immediately after the completion of Polymer Reactant Feed #1, Feed F was added to the reactor over 5 minutes. Immediately after the completion of Feed F, Polymer Reactant Feed #2 was added to the reactor over 5 minutes. After completion of Polymer Reactant Feed #2, the reactor temperature was maintained at 60° C. for 4 hours to assist in the consumption of Polymer Reactant Feed #1 and Polymer Reactant Feed #2. (The consumption of Polymer Reactant Feeds can readily be monitored during the reaction by a combination of gas chromatography, potentiometric titration and IR.) The contents of the reactor were then cooled to 25 ° C. and filtered through 100/325 mesh screens.

The resultant filtered latex had a pH of 6.0, a solids content of 45.0 wt %, particle size of 200 nm, and a Brookfield viscosity of 20 centipoise (number one spindle at 60 revolutions per minute). The latex was substantially free of coagulum, as measured by filtering through the 100 and 325 mesh screens.

EXAMPLE 2

The following table provides the reactor charges for a latex composition of the present invention. The procedure of Example 1 is followed, except that the aminopropylmorpholine in Polymer Reactant Feed #2 is replaced with dimethylaminopropylamine.

| REACTOR CHARGE | |
|---|---|
| INGREDIENT | AMOUNT (grams) |
| Initial Charge | |
| Deionized water | 978.6 |
| Nonylphenol 4.5 EO sulfate ammonium salt (58%) | 6.7 |
| Sodium lauryl sulfate (28%) | 13.3 |
| Sodium acetate | 7.78 |
| Feed A | |
| Ammonium persulfate | 6.5 |
| Deionized water | 36.0 |
| Feed B | |
| Acrylic polymer seed (45%; 150 nm) | 77.8 |
| Feed C | |
| Deionized water | 852.8 |
| Nonylphenol 4.5 EO sulfate ammonium salt (58%) | 26.6 |
| Feed D | |
| Butyl acrylate | 910.0 |
| Methyl methacrylate | 735.0 |
| Methacrylic anhydride | 87.5 |
| Methacrylic acid | 17.5 |
| Rinse 1 | |
| Deionized water | 50.0 |
| Feed E | |
| Ammonium persulfate | 1.0 |
| Deionized water | 60.0 |
| Feed F | |
| Nonylphenol ethoxylate 40 EO (70%) | 50.0 |
| Polymer Reactant Feed #1 | |
| Ammonium hydroxide (28%) | 12.35 |
| Polymer Reactant Feed #2 | |
| Dimethylaminopropylamine | 37.2 |
| Deionized water | 157.5 |

The resultant filtered latex had a pH of 7.5, a solids content of 44.5 wt %, particle size of 205 nm, and a Brookfield viscosity of 70 centipoise (number one spindle at 60 revolutions per minute). The latex was substantially free of coagulum, as measured by filtering through the 100 and 325 mesh screens.

EXAMPLE 3

The following table provides the reactor charges for a latex composition of the present invention. The procedure of Example 1 is followed, except that the aminopropylmorpholine in Polymer Reactant Feed #2 is replaced with triacetone diamine.

| REACTOR CHARGE | |
|---|---|
| INGREDIENT | AMOUNT (grams) |
| Initial Charge | |
| Deionized water | 978.6 |
| Nonylphenol 4.5 EO sulfate ammonium salt (58%) | 6.7 |
| Sodium lauryl sulfate (28%) | 13.3 |
| Sodium acetate | 7.78 |
| Feed A | |
| Ammonium persulfate | 6.5 |
| Deionized water | 36.0 |
| Feed B | |
| Acrylic polymer seed (45%; 150 nm) | 77.8 |
| Feed C | |
| Deionized water | 852.8 |
| Nonylphenol 4.5 EO sulfate ammonium salt (58%) | 26.6 |
| Feed D | |
| Butyl acrylate | 910.0 |
| Methyl methacrylate | 735.0 |
| Methacrylic anhydride | 87.5 |
| Methacrylic acid | 17.5 |
| Rinse 1 | |
| Deionized water | 50.0 |
| Feed E | |
| Ammonium persulfate | 1.0 |
| Deionized water | 60.0 |
| Feed F | |
| Nonylphenol ethoxylate 40 EO (70%) | 50.0 |
| Polymer Reactant Feed #1 | |
| Ammonium hydroxide (28%) | 12.35 |
| Polymer Reactant Feed #2 | |
| Triacetonediamine | 56.9 |
| Deionized water | 157.5 |

The resultant filtered latex had a pH of 7.9, a solids content of 45.0 wt %, particle size of 210 nm, and a Brookfield viscosity of 40 centipoise (number one spindle at 60 revolutions per minute). The latex was substantially free of coagulum, as measured by filtering through the 100 and 325 mesh screens.

EXAMPLE 4

The following table provides the reactor charges for a latex composition of the present invention. The procedure of Example 1 is followed, except that the aminopropylmorpholine in Polymer Reactant Feed #2 is replaced with N-butyl triacetone diamine.

| REACTOR CHARGE | |
|---|---|
| INGREDIENT | AMOUNT (grams) |
| Initial Charge | |
| Deionized water | 978.6 |
| Nonylphenol 4.5 EO sulfate ammonium salt (58%) | 6.7 |
| Sodium lauryl sulfate (28%) | 13.3 |
| Sodium acetate | 7.78 |
| Feed A | |
| Ammonium persulfate | 6.5 |
| Deionized water | 36.0 |
| Feed B | |
| Acrylic polymer seed (45%; 150 nm) | 77.8 |

-continued

| REACTOR CHARGE | |
|---|---|
| INGREDIENT | AMOUNT (grams) |
| Feed C | |
| Deionized water | 852.8 |
| Nonylphenol 4.5 EO sulfate ammonium salt (58%) | 26.6 |
| Feed D | |
| Butyl acrylate | 910.0 |
| Methyl methacrylate | 735.0 |
| Methacrylic anhydride | 87.5 |
| Methacrylic acid | 17.5 |
| Rinse 1 | |
| Deionized water | 50.0 |
| Feed E | |
| Ammonium persulfate | 1.0 |
| Deionized water | 60.0 |
| Feed F | |
| Nonylphenol ethoxylate 40 EO (70%) | 50.0 |
| Polymer Reactant Feed #1 | |
| Ammonium hydroxide (28%) | 12.35 |
| Polymer Reactant Feed #2 | |
| N-Butyl triacetonediamine | 77.3 |
| Deionized water | 157.5 |

The resultant filtered latex had a pH of 8.0, a solids content of 44.5 wt %, particle size of 205 nm, and a Brookfield viscosity of 40 centipoise (number one spindle at 60 revolutions per minute). The latex was substantially free of coagulum, as measured by filtering through the 100 and 325 mesh screens.

EXAMPLE 5

The following table provides the reactor charges for a latex composition of the present invention. The procedure of Example 1 is followed, except that the methacrylic anhydride level is decreased by 50% (from 5 to 2.5 wt % based on monomers), and the aminopropylmorpholine in Polymer Reactant Feed #2 is decreased by 50%.

| REACTOR CHARGE | |
|---|---|
| INGREDIENT | AMOUNT (grams) |
| Initial Charge | |
| Deionized water | 978.6 |
| Nonylphenol 4.5 EO sulfate ammonium salt (58%) | 6.7 |
| Sodium lauryl sulfate (28%) | 13.3 |
| Sodium acetate | 7.78 |
| Feed A | |
| Ammonium persulfate | 6.5 |
| Deionized water | 36.0 |
| Feed B | |
| Acrylic polymer seed (45%; 150 nm) | 77.8 |
| Feed C | |
| Deionized water | 852.8 |
| Nonylphenol 4.5 EO sulfate ammonium salt (58%) | 26.6 |
| Feed D | |
| Butyl acrylate | 910.0 |
| Methyl methacrylate | 778.7 |
| Methacrylic anhydride | 43.7 |
| Methacrylic acid | 17.5 |
| Rinse 1 | |
| Deionized water | 50.0 |
| Feed E | |
| Ammonium persulfate | 1.0 |
| Deionized water | 60.0 |
| Feed F | |
| Nonylphenol ethoxylate 40 EO (70%) | 50.0 |
| Polymer Reactant Feed #1 | |
| Ammonium hydroxide (28%) | 12.35 |
| Polymer Reactant Feed #2 | |
| Aminopropylmorpholine | 26.2 |
| Deionized water | 157.5 |

The resultant filtered latex had a pH of 8.2, a solids content of 45.0 wt %, particle size of 190 nm, and a Brookfield viscosity of 20 centipoise (number one spindle at 60 revolutions per minute). The latex was substantially free of coagulum, as measured by filtering through the 100 and 325 mesh screens.

EXAMPLE 6

The following table provides the reactor charges for a latex composition of the present invention. The procedure of Example 1 is followed, except that the methacrylic anhydride level is doubled (from 5 to 10 wt % based on monomers), and the aminopropylmorpholine in Polymer Reactant Feed #2 is also doubled. In addition, the solids level is lowered from 45 to 38 wt % by adding additional water with Polymer Reactant Feed #2.

| REACTOR CHARGE | |
|---|---|
| INGREDIENT | AMOUNT (grams) |
| Initial Charge | |
| Deionized water | 978.6 |
| Nonylphenol 4.5 EO sulfate ammonium salt (58%) | 6.7 |
| Sodium lauryl sulfate (28%) | 13.3 |
| Sodium acetate | 7.78 |
| Feed A | |
| Ammonium persulfate | 6.5 |
| Deionized water | 36.0 |
| Feed B | |
| Acrylic polymer seed (45%; 150 nm) | 77.8 |
| Feed C | |
| Deionized water | 852.8 |
| Nonylphenol 4.5 EO sulfate ammonium salt (58%) | 26.6 |
| Feed D | |
| Butyl acrylate | 910.0 |
| Methyl methacrylate | 647.6 |
| Methacrylic anhydride | 174.8 |

-continued

| REACTOR CHARGE | |
|---|---|
| INGREDIENT | AMOUNT (grams) |
| Methacrylic acid | 17.5 |
| Rinse 1 | |
| Deionized water | 50.0 |
| Feed E | |
| Ammonium persulfate | 1.0 |
| Deionized water | 60.0 |
| Feed F | |
| Nonylphenol ethoxylate 40 EO (70%) | 50.0 |
| Polymer Reactant Feed #1 | |
| Ammonium hydroxide (28%) | 12.35 |
| Polymer Reactant Feed #2 | |
| Aminopropylmorpholine | 104.8 |
| Deionized water | 1131.2 |

The resultant filtered latex had a pH of 8.0, a solids content of 38.0 wt %, particle size of 211 nm, and a Brookfield viscosity of 8,500 centipoise (number 4 spindle at 60 revolutions per minute). The latex was substantially free of coagulum, as measured by filtering through the 100 and 325 mesh screens.

EXAMPLE 7

The following table provides the reactor charges for a latex composition of the present invention. In this example, the methacrylic anhydride level is 30.6% based on total monomers, and the reactant feed #2 is 1 equivalent of dimethylaminopropylamine (based on methacrylic anhydride). The procedure is described below.

| REACTOR CHARGE | |
|---|---|
| INGREDIENT | AMOUNT (grams) |
| Initial Charge | |
| Deionized water | 782.1 |
| Feed A | |
| Ammonium persulfate | 0.33 |
| Deionized water | 10.0 |
| Feed B | |
| Acrylic polymer seed (32.5%; 175 nm) | 52.6 |
| Feed C | |
| Deionized water | 367.9 |
| Nonylphenol 4.5 EO sulfate ammonium salt (58%) | 18.2 |
| Feed D | |
| Ethyl acrylate | 261.8 |
| Methyl methacrylate | 88.9 |
| Methacrylic anhydride | 154.8 |
| Rinse 1 | |
| Deionized water | 16.6 |
| Feed E | |
| Ammonium persulfate | 0.64 |
| Deionized water | 43.5 |
| Feed F | |
| Deionized Water | 3223.2 |

-continued

| REACTOR CHARGE | |
|---|---|
| INGREDIENT | AMOUNT (grams) |
| Polymer Reactant Feed #1 | |
| Ammonium hydroxide (28%) | 3.46 |
| Polymer Reactant Feed #2 | |
| Dimethylaminopropylamine | 102.7 |

The initial reactor charge was heated, with stirring, to 85°–88° C. under a nitrogen blanket while Feeds A, C, D, E, and F, Polymer Reactant Feed #1, and Polymer Reactant Feed #2 were being prepared. When the reactor kettle reached 88° C., Feed A was fed to the reactor over 2 minutes. Immediately after completion of Feed A, Feed B was added to the reactor over 5 minutes. Immediately after completion of Feed B, Feed "CD" and Feed E were simultaneously begun. (Feed "CD" is the emulsion produced by mixing Feed D into Feed C.) Feed C/D was added, with constant stirring, over 60 minutes, while maintaining the reaction temperature at 85° C. throughout the addition of Feed C/D; and Feed E was added over 70 minutes. After completion of Feed E, the contents of the reactor were held for 30 minutes at 85° C. At that point, Feed F was added to the reactor over 5 minutes and Polymer Reactant Feed #1 was added to the reactor over 5 minutes. Immediately after the completion of Polymer Reactant Feed #1, Polymer Reactant Feed #2 was added to the reactor over 5 minutes. After completion of Polymer Reactant Feed #2, the reactor temperature was maintained at 90° C. for 8 hours to assist in the consumption of Polymer Reactant Feed #1 and Polymer Reactant Feed #2. (The consumption of Polymer Reactant Feeds can readily be monitored during the reaction by a combination of gas chromatography, potentiometric titration and IR.) The contents of the reactor were then cooled to 25° C. and filtered through 100/325 mesh screens.

The resultant filtered latex had a pH of 7.2, a solids content of 11.2 wt %, particle size of 254 nm, and a Brookfield viscosity of 16,000 centipoise (number four spindle at 30 revolutions per minute). The latex was substantially free of coagulum, as measured by filtering through the 100 and 325 mesh screens. The resulting latex was readily converted into a solution polymer with either acid or base.

EXAMPLE 8

The following table provides the reactor charges for a latex composition of the present invention. The procedure of Example 5 is followed, except that the aminopropylmorpholine in Polymer Reactant Feed #2 is substantially decreased and a curing agent is post added to the final latex after cool down.

| REACTOR CHARGE | |
|---|---|
| INGREDIENT | AMOUNT (grams) |
| Initial Charge | |
| Deionized water | 978.6 |
| Nonylphenol 4.5 EO sulfate ammonium salt (58%) | 6.7 |
| Sodium lauryl sulfate (28%) | 13.3 |
| Sodium acetate | 7.78 |

-continued

| REACTOR CHARGE | |
|---|---|
| INGREDIENT | AMOUNT (grams) |
| Feed A | |
| Ammonium persulfate | 6.5 |
| Deionized water | 36.0 |
| Feed B | |
| Acrylic polymer seed (45%; 150 nm) | 77.8 |
| Feed C | |
| Deionized water | 852.8 |
| Nonylphenol 4.5 EO sulfate ammonium salt (58%) | 26.6 |
| Feed D | |
| Butyl acrylate | 910.0 |
| Methyl methacrylate | 778.7 |
| Methacrylic anhydride | 43.7 |
| Methacrylic acid | 17.5 |
| Rinse 1 | |
| Deionized water | 50.0 |
| Feed E | |
| Ammonium persulfate | 1.0 |
| Deionized water | 60.0 |
| Feed F | |
| Nonylphenol ethoxylate 40 EO (70%) | 50.0 |
| Polymer Reactant Feed #1 | |
| Ammonium hydroxide (28%) | 12.35 |
| Polymer Reactant Feed #2 | |
| Aminopropylmorpholine | 2.62 |
| Deionized water | 15.75 |
| Post Added Curing Agent | |
| Jeffamine ® D-400 | 37.2 |
| Deionized water | 141.8 |

The resultant filtered latex had a pH of 9.5, a solids content of 45.0 wt %, particle size of 200 nm, and a Brookfield viscosity of 30 centipoise (number one spindle at 60 revolutions per minute). The latex was substantially free of coagulum, as measured by filtering through the 100 and 325 mesh screens. The resulting latex film, after drying 10 days at room temperature, was insoluble in a solution of 95% THF/4% water/1% HCl, indicative of a highly cured/crosslinked acrylic film. The film generated from the control polymer in Example 5 (with no curing agent) was soluble in the solution of 95% THF/4% water/1% HCl, indicative of an uncrosslinked film.

I claim:

1. A method for preparing an acid and amine-functional polymer under conditions of free-radical initiated addition polymerization, comprising the steps of:
   (a) first, copolymerizing an anhydride monomer with an ethylenically unsaturated monomer to produce an anhydride polymer, wherein the amount of anhydride monomer is between 0.1 and 50.0 wt % based on the total monomer weight;
   (b) followed by addition of base thereto;
   (c) followed immediately by addition of between 0.001 and 2.0 moles of diamine per mole of anhydride; and
   (d) allowing the components to react.

2. The method of claim 1, wherein the polymerization is conducted in an aqueous medium, the copolymerization of the anhydride monomer with an ethylenically unsaturated monomer is accomplished in the presence of surfactant, and the base and diamine are added to the system before a significant portion of the anhydride functionality of the polymer has hydrolyzed.

3. The method of claim 1, wherein the diamine comprises a compound of formula:

wherein:
   $R^1$=H;
   $R^2$=H, lower alkyl, optionally containing heteroatoms such as O, S or N, so long as the group is nonreactive with respect to anhydrides;
   $R^3$ is an optional spacer group, and can be lower alkylene, optionally containing secondary, tertiary or quaternary lower alkyl; and also optionally containing heteroatoms O, S or N, so long as the group is non-reactive with respect to anhydrides;
   $R^4$ is a sterically hindered, optionally cyclic, amine that is non-reactive with respect to anhydrides, and optionally includes non amine-reactive substituents.

4. The method of claim 3, wherein: $R^4$=—$NR^5R^6$ or a 4- to 7-membered nitrogen-containing ring, optionally substituted with non amine-reactive groups such as heteroatoms or secondary, tertiary or quaternary lower alkyl; $R^5$, $R^6$=H, lower alkyl, optionally containing secondary, tertiary or quaternary lower alkyl, and also optionally containing heteroatoms O, S or N, so long as the group is non-reactive with respect to anhydrides; and provided that $R^5$ or $R^6$ can be H only if the other is t-butyl or a more hindered group.

5. The method of claim 4, wherein the diamine is selected from the group consisting of: 3-diethylaminopropylamine, 3-dimethylaminopropylamine, N,N-diethyl-N'-methylethylenediamine, N,N-diethylethylenediamine, aminopropyldiethanolamine, 2-amino-5-diethylaminopentane, 4-(2-aminoethyl)morpholine, aminopropylmorpholine, 1-amino-4-methylpiperazine, 2-(aminomethyl)-1-ethylpyrrolidine, 4-aminomorpholine, 1-amino-4-(2-hydroxyethyl)piperazine, N-aminohexamethyleneimine, triacetonediamine, N-butyl 'triacetonediamine, 2-(aminomethyl)pyridine, 3-(aminomethyl)pyridine, 4-(aminomethyl)pyridine, and 5-amino-2-methoxypyridine.

6. The method of claim 5, wherein the diamine is selected from the group consisting of: 3-dimethylaminopropylamine, triacetonediamine, and N-butyl triacetonediamine.

7. The method of claim 1, wherein the anhydride monomer is selected from those that contain unsaturation and are capable of undergoing free radical polymerization.

8. The method of claim 7, wherein the anhydride monomer is selected from the group consisting of: citraconic anhydride, maleic anhydride, tetrahydrophthalic anhydride, itaconic anhydride, acrylic anhydride, methacrylic anhydride, n-octenyl succinic anhydride, n-decenyl succinic anhydride, n-dodecenyl succinic anhydride, n-tetradecenyl succinic anhydride, n-hexadecenyl succinic anhydride, n-tricontenyl succinic anhydride, nonenyl succinic anhydride, iso-hexadecenyl succinic anhydride, and iso-octadecenyl succinic anhydride.

9. The method of claim 8, wherein the anhydride monomer is selected from the group consisting of: acrylic or methacrylic anhydride.

* * * * *

UNITED STATES PATENT AND TRADEMARK OFFICE
CERTIFICATE OF CORRECTION

PATENT NO. : 5,869,581
DATED : February 9, 1999
INVENTOR(S) : Thomas Glenn Madle It is certified that error appears in the above-identified patent and that said Letters Patent is hereby corrected as shown below:

On title page, item 19 Inventor Surname
Replace "Tysak", with --Madle--.

On title page, item 54 Title of Invention
Replace "Aqueous Polish Compositions Containing Acid-Amine Latexes", with --Processes for Preparing Polymer Compositions Containing Both Acid and Amine Functionality--.

On title page, item 75 Inventor:
Replace "Theodore Tysak, Amber, PA", with --Thomas Glenn Madle, Flourtown, PA--.

On title page, item 21 Appl. No.
Replace "911,975", with --911,974--.

On title page, item 60 Provisional Appl. No.
Replace "60/024,423 Aug. 20, 1996", with --60/024,422 Aug.20, 1996--.

UNITED STATES PATENT AND TRADEMARK OFFICE
CERTIFICATE OF CORRECTION

PATENT NO.   : 5,869,581
DATED        : February 9, 1999
INVENTOR(S)  : Thomas Glenn Madle It is certified that error appears in the above-identified patent and that said Letters Patent is hereby corrected as shown below:

Col. 1, line 1
Replace "AQUEOUS POLISH COMPOSITIONS CONTAINING ACID AMINE LATEXES", with --Process for Preparing Polymer Compostions Containing Both Acid and Amine Functionality--

Col. 1, line 5
Replace "provisional application Ser. No. 60/024,423 filed Aug. 20,", with --provisional application Ser.No. 60/024,422 filed Aug. 20,--.

Col. 1, line 6
Replace "1997", with --1996--.

Signed and Sealed this

Tenth Day of July, 2001

*Attest:*

NICHOLAS P. GODICI
*Attesting Officer*     *Acting Director of the United States Patent and Trademark Office*